(12) United States Patent
Thomas et al.

(10) Patent No.: US 9,832,106 B2
(45) Date of Patent: Nov. 28, 2017

(54) SYSTEM AND METHOD FOR DETECTING NETWORK NEIGHBOR REACHABILITY

(71) Applicant: Juniper Networks, Inc., Sunnyvale, CA (US)

(72) Inventors: Reji Thomas, Bangalore (IN); Vivek Ramesh, Kottayam (IN); Jithin Girish, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 297 days.

(21) Appl. No.: 14/747,734

(22) Filed: Jun. 23, 2015

(65) Prior Publication Data

US 2016/0380882 A1    Dec. 29, 2016

(51) Int. Cl.
| | | |
|---|---|---|
| *H04L 12/721* | (2013.01) | |
| *H04L 12/733* | (2013.01) | |
| *H04L 12/741* | (2013.01) | |
| *H04L 29/12* | (2006.01) | |
| *H04L 12/703* | (2013.01) | |

(52) U.S. Cl.
CPC ............ *H04L 45/26* (2013.01); *H04L 45/20* (2013.01); *H04L 45/74* (2013.01); *H04L 61/2007* (2013.01); *H04L 61/6059* (2013.01); *H04L 45/28* (2013.01)

(58) Field of Classification Search
CPC ......... H04L 45/26; H04L 45/20; H04L 45/74; H04L 61/2007; H04L 61/6059
See application file for complete search history.

(56) References Cited

U.S. PATENT DOCUMENTS 8,416,701 B1 *  4/2013 Smead ................ H04L 67/1097
                                                      370/250
2007/0280135 A1 * 12/2007 Syed .................. H04L 43/0817
                                                      370/254

(Continued)

FOREIGN PATENT DOCUMENTS

WO    WO 2015/006636 A1    1/2015

OTHER PUBLICATIONS

T. Narten et al., Neighbor Discovery for IP version 6 (IPv6), IETF, Request for Comments 4861, Sep. 2007.

(Continued)

*Primary Examiner* — Chi H Pham
*Assistant Examiner* — Weibin Huang
(74) *Attorney, Agent, or Firm* — FisherBroyles, LLP (57) ABSTRACT

The disclosed system may include (1) a cache module, stored in memory, that stores a neighbor cache entry that specifies whether a neighbor of a network node is reachable according to a detection mechanism, (2) a timeout module, stored in memory, that specifies a timing interval in which to select a reachable time threshold, (3) a reception module, stored in memory, that receives event information about whether the neighbor is active, (4) a biasing module, stored in memory, that biases, based on the received event information about whether the neighbor is active, a selection of the reachable time threshold within the timing interval, and (5) a determination module, stored in memory, that determines whether the neighbor is reachable based at least in part on a determination of whether the selected reachable time threshold has been satisfied. Various other systems and methods are also disclosed.

20 Claims, 7 Drawing Sheets

(56) References Cited

U.S. PATENT DOCUMENTS

| | | | | |
|---|---|---|---|---|
| 2012/0224576 A1* | 9/2012 | Gu | ...................... | H04L 61/2046 |
| | | | | 370/390 |
| 2014/0337504 A1* | 11/2014 | Lorch | ................... | G06F 1/3203 |
| | | | | 709/224 |
| 2015/0058989 A1* | 2/2015 | Lahti | ....................... | H04L 49/90 |
| | | | | 726/23 |
| 2016/0174148 A1* | 6/2016 | Seed | ................. | H04W 52/0216 |
| | | | | 370/311 |

OTHER PUBLICATIONS

Nordmark, E. et al., "Neighbor Unreachability Detection is too impatient draft-ietf-6man-impatient-nud-06.txt", https://wiki.tools.ietf.org/html/draft-ietf-6man-impatient-nud-06, as accessed May 22, 2015, RFC 4861, IETF, (Apr. 24, 2013).

Narten, T. et al., "Neighbor Discovery for IP version 6 (IPv6)", https://wiki.tools.ietf.org/html/rfc4861, as accessed May 22, 2015, RFC 4861, (Sep. 2007).

* cited by examiner

SYSTEM AND METHOD FOR DETECTING NETWORK NEIGHBOR REACHABILITY

INCORPORATION BY REFERENCE

This application incorporates, by reference, the following documents, which are concurrently filed with an Information Disclosure Statement in the U.S. Patent and Trademark Office:

"Neighbor Unreachability Detection is Too Impatient," by Igor Gashinsky and available at https://wiki.tools.ietf.org/html/draft-ietf-6man-impatient-nud-06 (last accessed 22 May 2015).

"Neighbor Discovery for IP version 6 (IPv6)" by Thomas Narten, Erik Nordmark, William Allen Simpson, and Hesham Soliman and available at https://wiki.tools.ietf.org/html/rfc4861 (last accessed 22 May 2015).

BACKGROUND

Network computing environments operate according to one or more networking protocols, which may provide rules and regulations for traffic on the corresponding networks. For example, one common networking protocol is INTERNET PROTOCOL version six ("IPv6"), which corresponds to an updated version of the previous INTERNET PROTOCOL version four. INTERNET PROTOCOL version six includes subsidiary rules and protocols, such as the NEIGHBOR DISCOVERY PROTOCOL ("NDP"). NDP regulates several functions for IPv6, including address autoconfiguration of nodes, discovery of other nodes on the link, and determination of the link layer addresses of other nodes. NDP also includes a NEIGHBOR UNREACHABILITY DETECTION ("NUD") protocol, which, in comparison to IPv4, improves the robustness of packet delivery in the presence of failing routers or links.

The NUD protocol categorizes network nodes into one or more states to indicate whether the nodes are reachable by another node. To determine whether the nodes are reachable, the other node may transmit a specialized message, which is called a neighbor solicitation. In response, the other nodes may reply by transmitting another specialized message, which is called a neighbor advertisement. After first categorizing a node as reachable, the NUD protocol specifies rules for potentially expiring the categorization and eventually restarting the process of exchanging node solicitation and node advertisement messages.

Nevertheless, in a network environment with a large number of nodes, numerous categorizations of other nodes as reachable may expire at the same or substantially the same time. For example, one node may learn about approximately 100,000 other nodes in the span of a second. In this case, all of the reachability categorizations for these other nodes may expire at approximately the same time, which may stress or choke the network and underlying devices. Accordingly, the instant disclosure identifies and addresses a need for additional and improved systems and methods for detecting network neighbor reachability.

SUMMARY

As will be described in greater detail below, the instant disclosure generally relates to systems and methods for detecting network neighbor reachability. In one example, a system for accomplishing such a task may include (1) a cache module, stored in memory, that stores a neighbor cache entry that specifies whether a neighbor of a network node is reachable according to a detection mechanism of a neighbor unreachability detection protocol, (2) a timeout module, stored in memory, that specifies a timing interval in which to select a reachable time threshold that defines a length of time during which the neighbor is designated as reachable according to the neighbor unreachability detection protocol, (3) a reception module, stored in memory, that receives event information about whether the neighbor is active, (4) a biasing module, stored in memory, that biases, based on the received event information about whether the neighbor is active, a selection of the reachable time threshold within the timing interval, and (5) a determination module, stored in memory, that determines whether the neighbor is reachable based at least in part on a determination of whether the selected reachable time threshold has been satisfied. The system may also include at least one physical processor that is configured to execute one or more of these modules.

Similarly, a method for accomplishing the above-described task may include (1) storing a neighbor cache entry that specifies whether a neighbor of a network node is reachable according to a detection mechanism of a neighbor unreachability detection protocol, (2) specifying a timing interval in which to select a reachable time threshold that defines a length of time during which the neighbor is designated as reachable according to the neighbor unreachability detection protocol, (3) receiving event information about whether the neighbor is active, (4) biasing, based on the received event information about whether the neighbor is active, a selection of the reachable time threshold within the timing interval, and (5) determining whether the neighbor is reachable based at least in part on a determination of whether the selected reachable time threshold has been satisfied.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to: (1) store a neighbor cache entry that specifies whether a neighbor of a network node is reachable according to a detection mechanism of a neighbor unreachability detection protocol, (2) specify a timing interval in which to select a reachable time threshold that defines a length of time during which the neighbor is designated as reachable according to the neighbor unreachability detection protocol, (3) receive event information about whether the neighbor is active, (4) bias, based on the received event information about whether the neighbor is active, a selection of the reachable time threshold within the timing interval, and (5) determine whether the neighbor is reachable based at least in part on a determination of whether the selected reachable time threshold has been satisfied.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for detecting network neighbor reachability. As will be explained in greater detail below, embodiments of the instant disclosure may enable computer networking systems to perform neighbor unreachability detection more efficiently while avoiding large numbers of simultaneous transmissions of neighbor solicitation messages, as discussed further below. Specifically, embodiments of the instant disclosure may enable computer networking systems to expand a timing interval in which to select a reachable time threshold without allowing higher priority neighbor solicitation messages to wait unduly long.

Figure 1:
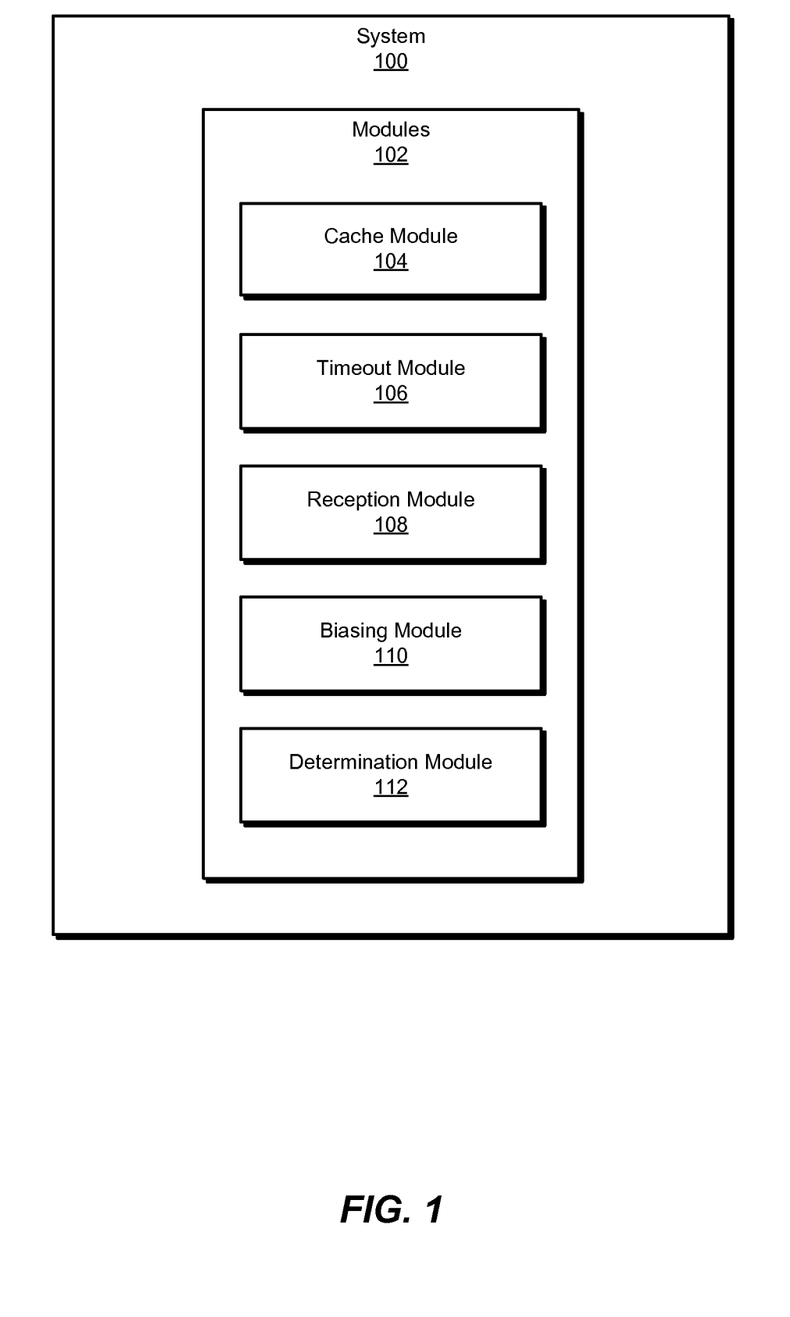
FIG. 1 is a block diagram of an exemplary system for detecting network neighbor reachability.
Figure 2:
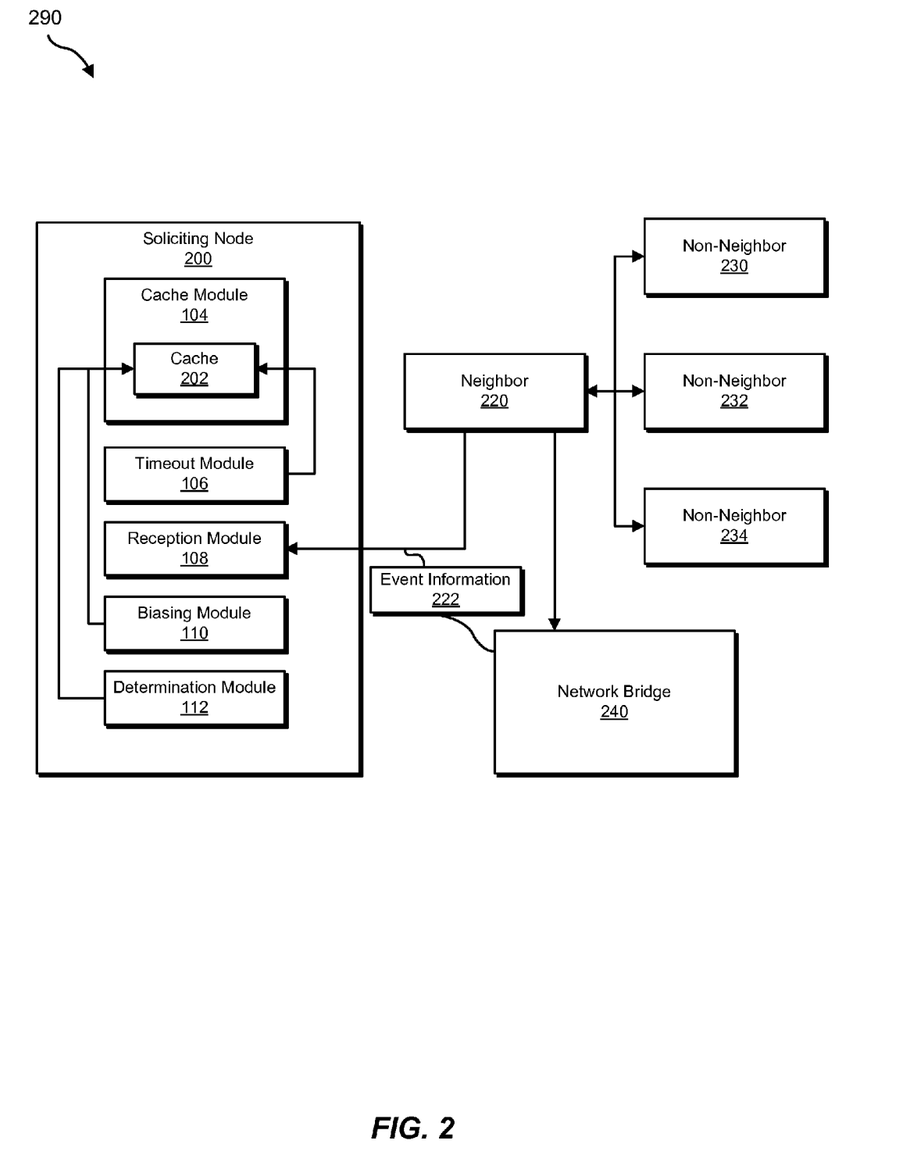
FIG. 2 is a block diagram of an exemplary system for detecting network neighbor reachability.

The following will provide, with reference to FIGS. 1-2, examples of exemplary systems for detecting neighbor reachability. Similarly, the following will provide, with reference to FIGS. 3, 4, and 6, examples of a flow diagram, a timing diagram, and a state diagram corresponding to the exemplary systems for detecting neighbor reachability. Moreover, the following will also provide, with reference to FIG. 5, an example of an exemplary block diagram of a cache and network bridge. Finally, the discussion corresponding to FIG. 7 will provide numerous examples of systems that may include the components and circuits shown in FIGS. 1-6.

FIG. 1 is a block diagram of an exemplary system 100 for detecting network neighbor reachability. As illustrated in this figure, exemplary system 100 may include one or more modules 102 for performing one or more tasks. For example, and as will be explained in greater detail below, exemplary system 100 may include a cache module 104, stored in memory, that stores a neighbor cache entry that specifies whether a neighbor of a network node is reachable according to a detection mechanism of a neighbor unreachability detection protocol. Exemplary system 100 may also include a timeout module 106, stored in memory, that specifies a timing interval in which to select a reachable time threshold that defines a length of time during which the neighbor is designated as reachable according to the neighbor unreachability detection protocol.

Additionally, exemplary system 100 may include a reception module 108, stored in memory, that receives event information about whether the neighbor is active. Exemplary system 100 may further include a biasing module 110, stored in memory, that biases, based on the received event information about whether the neighbor is active, a selection of the reachable time threshold within the timing interval. Moreover, as further shown in FIG. 1, exemplary system 100 may also include a determination module 112, stored in memory, that determines whether the neighbor is reachable based at least in part on a determination of whether the selected reachable time threshold has been satisfied.

As shown in FIG. 2, in some examples, system 100 may constitute part of a larger networking system 290. As shown in that figure, in some embodiments system 100 may take the form of a soliciting node 200 in a computing networking environment. Soliciting node 200 may include all or any permutation of modules 102. Soliciting node may solicit a neighbor advertisement from another node on the network, such as a neighbor 220. As shown in FIG. 2, system 290 may also include a non-neighbor 230, a non-neighbor 232, and a non-neighbor 234. Each of soliciting node 200, neighbor 220, non-neighbor 230, non-neighbor 232, and non-neighbor 234 may constitute a node, such as a host or a router, according to a computer networking protocol such as INTERNET PROTOCOL version six. Moreover, as further shown in FIG. 2, neighbor 220 has a direct connection with soliciting node 200 (in other words, attached at the same link at the link layer) whereas the non-neighboring nodes do not have a direct connection and do not constitute neighbors of soliciting node 200.

In the example of FIG. 2, all of modules 102 are located within soliciting node 200. Nevertheless, in other examples, one or more other nodes or computing devices may contain one or more of modules 102 and provide corresponding functionality. For example, a remote management node or proxy could conceivably store cache module 104 or biasing module 110, as discussed further below.

As shown in FIG. 2, cache module 104 may include a cache 202, which may store one or more neighbor cache entries in accordance with a neighbor discovery protocol, such as neighbor discovery according to INTERNET PROTOCOL version six. An example of cache 202 will be discussed further below in connection with FIG. 5. Moreover, as also shown in FIG. 2, system 290 may further include a network bridge 240. As used herein, the term "network bridge" generally refers to any network device that connects two or more communication networks or network segments at the physical and/or data link layers of the OPEN SYSTEMS INTERCONNECTION module. FIG. 2 further illustrates how network bridge 240, as well as neighbor 220 itself, may provide event information to soliciting node 200 about whether neighbor 220 is active and/or available.

Figure 3:
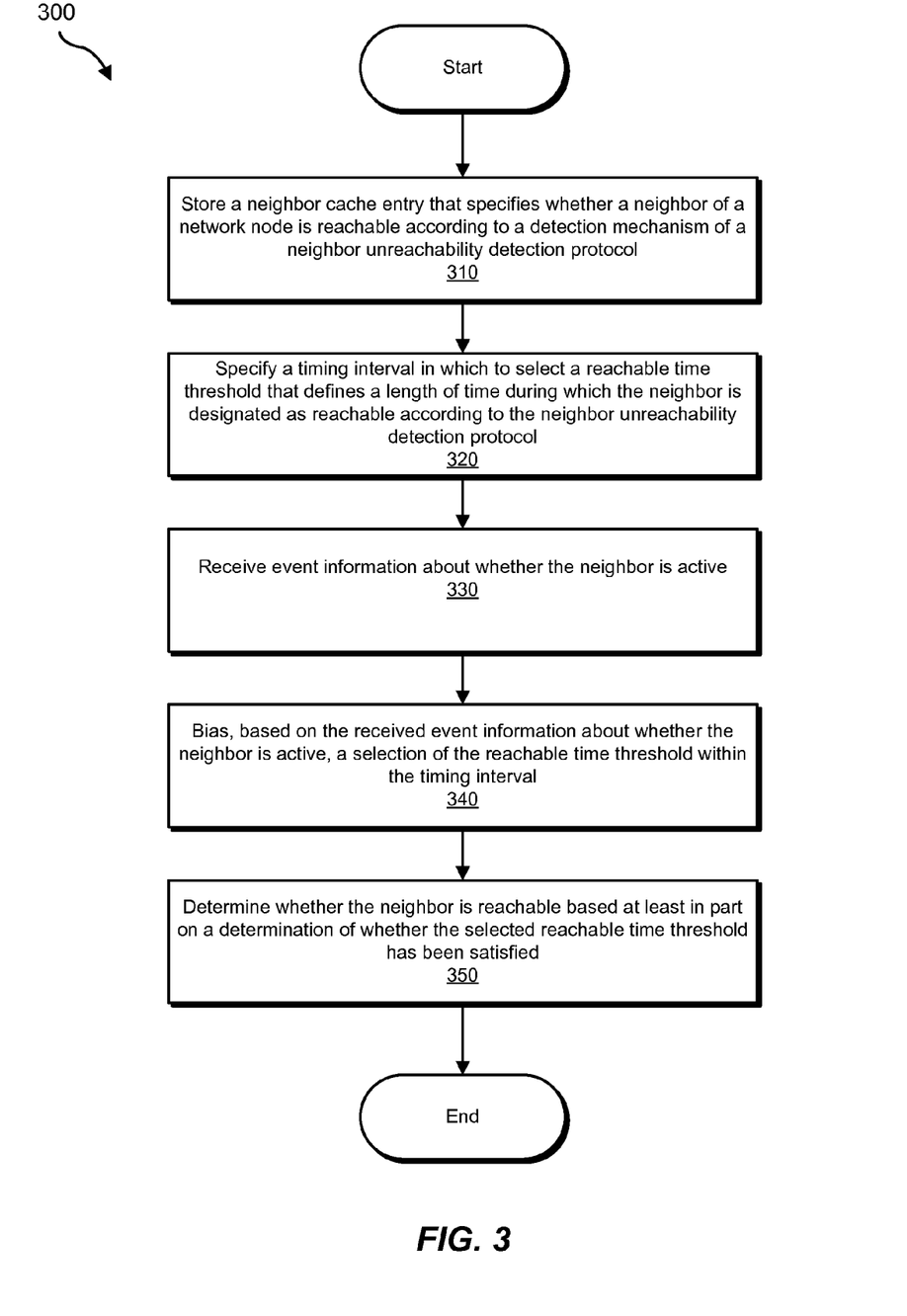
FIG. 3 is a flow diagram of an exemplary method for detecting network neighbor reachability.

FIG. 3 is a flow diagram of an exemplary computer-implemented method 300 for detecting network neighbor reachability. The steps shown in FIG. 3 may be performed by any suitable computer-executable code and/or computing system. In some embodiments, the steps shown in FIG. 3 may be performed by one or more of the components of system 100 in FIG. 1, system 290 in FIG. 2, and/or portions of exemplary computing system 700 in FIG. 7.

As illustrated in FIG. 3, at step 310, one or more of the systems described herein may store a neighbor cache entry that specifies whether a neighbor of a network node is reachable according to a detection mechanism of a neighbor unreachability detection protocol. For example, cache module 104 may, as part of system 100, store a neighbor cache entry (e.g., within cache 202) that specifies whether neighbor 220 of soliciting node 200 is reachable according to a detection mechanism of a neighbor unreachability detection protocol.

As used herein, the term "cache" generally refers to a storage element that stores neighbor cache entries for recording information about neighbor nodes on a computing network, as discussed further below. In some embodiments, a cache may be specialized for handling larger volumes or speeds of data operations (e.g., fast paced neighbor cache entry creation, deletion, and modification). Moreover, as used herein, the term "neighbor cache entry" generally refers to a record, such as a database record, or other data structure, for recording information about neighbor nodes on the computing network.

As used herein, and as first discussed above, the term "neighbor" of a network node generally refers to another network node that is attached at the same link as defined by the link layer of the corresponding network model (e.g., the lowest layer of the INTERNET PROTOCOL suite). Furthermore, unless otherwise specified, as used herein "reachable" generally refers to the combined ability of a soliciting node to transmit packets that reach a target node and ability of the target node to reply with packets that reach the original soliciting node (e.g., in a neighbor solicitation and neighbor advertisement exchange). In alternative embodiments, when specified, "reachable" may refer to the ability of one node to transmit packets that reach a target node regardless of whether packets from the target node may also reach the original transmitting node.

Additionally, as used herein, the term "detection mechanism" generally refers to a mechanism specified by a neighbor unreachability detection protocol to determine whether a node is unreachable. In the example of IPv6, the detection mechanism may correspond to the neighbor solicitation and neighbor advertisement exchange mechanism specified within the NUD protocol. Similarly, as used herein, the term "neighbor unreachability detection protocol" generally refers to any protocol, or set of rules and regulations, specifying a system or mechanism for detecting whether a node is reachable. Notably, in the context of this application, the NUD protocol of IPv6 provides an exemplary embodiment. Nevertheless, the concepts, insights, and improvements of the disclosed systems and methods are not limited to the context of IPv6 and its NUD protocol but can generally apply to any computer networking protocol for detecting whether nodes are reachable on a common network. For example, the disclosed systems and methods may apply in parallel to the ADDRESS RESOLUTION PROTOCOL and IPv4.

Cache module 104 may store the neighbor cache entry in a variety of ways. In general, cache module 104 may create the neighbor cache entry upon reception (e.g., at an interface of soliciting node 200) of a network packet from the corresponding neighbor, such as neighbor 220. Similarly, cache module 104 may delete the neighbor cache entry upon the expiration of a probing period that attempts to probe and reconfirm reachability with neighbor 220 after the earlier expiration of the reachable time threshold, as discussed further below. Cache module 104 may store neighbor cache entries within a cache, such as cache 202, which may further include a database, a table, and/or any other suitable data structure for recording information about other nodes on the network. Moreover, cache module 104 may record, for each neighbor cache entry, an INTERNET PROTOCOL ("IP") address, a MEDIA ACCESS CONTROL ("MAC") address, a node unreachability state, event information 222, a priority categorization, a timestamp (e.g., a timestamp of the last message received from the corresponding neighbor), the reachable time threshold, and/or one or more underlying or associated values for selecting the reachable time threshold and performing node unreachability detection. Notably, as used herein and unless otherwise specified, the terms "IP address" and "MAC address" generally refer to pure forms of these addresses as well as modified or embellished versions of these addresses, such as link layer addresses, which may also include other items or fields of information by appending. This application will further discuss an example of a state diagram for node unreachability detection in connection with FIG. 6 and an example of cache 202 in connection with FIG. 5.

Returning to FIG. 3, at step 320, one or more of the systems described herein may specify a timing interval in which to select a reachable time threshold that defines a length of time during which the neighbor is designated as reachable according to the neighbor unreachability detection protocol. For example, timeout module 106 may, as part of system 100, specify a timing interval in which to select a reachable time threshold that defines a length of time during which neighbor 220 is designated as reachable according to the neighbor unreachability detection protocol.

As used herein, the term "timing interval" generally refers to a period of time. One or both of the beginning and end of the period of time may be fixed and definite or open-ended (e.g., a timing interval that begins at a specific time and then never ends). Similarly, one or both of the beginning and end may be defined as a static and fixed point in time. Alternatively, one or both of the beginning and end may be defined as dynamic in terms of one or more underlying variables that may change over time. In exemplary embodiments, the timing interval generally refers to a relatively short and fixed period of time, such as the period of time between 28 seconds and 32 seconds after a reachability confirmation, as discussed further below.

Furthermore, as used herein, the term "reachable time threshold" generally defines a length of time during which the neighbor is designated as reachable. In other words, the reachable time threshold generally defines when a "reachable" categorization or designation will expire in the absence of a new confirmation. One or more formulas, equations, and/or algorithms may define or select the reachable time threshold. Moreover, the disclosed systems and methods may modify or adjust these formulas, equations, and/or algorithms based on one or more items of received event information, as also discussed further below.

Timeout module 106 may specify the timing interval in a variety of ways. For example, a network administrator (e.g., providing input to timeout module 106) and/or a network management software agent may specify all or part of the timing interval. In one specific example, the network administrator may specify a beginning point for the timing interval, an endpoint for the timing interval, a formula or algorithm for calculating the timing interval, and/or the values for one or more underlying variables in which the timing interval is defined.

In the example of IPv6 and its protocol for neighbor discovery, the network administrator and/or network management software agent may specify a "BaseReachableTime" value as well as MIN_RANDOM_FACTOR and MAX_RANDOM_FACTOR values for selecting the reachable time threshold. In this example, the reachable time threshold may correspond to a value selected, as a uniform random variable, between (MIN_RANDOM_FACTOR*BaseReachableTime) and (MAX_RANDOM_FACTOR*BaseReachableTime) in milliseconds. Accordingly, the specification of BaseReachableTime, MIN_RANDOM_FACTOR, and/or MAX_RANDOM_FACTOR, as well as the specification of the formula for multiplying them (e.g., MIN_RANDOM_FACTOR*BaseReachableTime) thereby further specifies the timing interval in which the reachable time threshold is selected, as discussed further below. Moreover, in the example of IPv6 and its neighbor discovery protocol, the value selected within this timing interval corresponds to the variable "ReachableTime." In other words, the specification of these variables and algorithm further specifies endpoints that define the timing interval.

Although these variables and the corresponding algorithm relate to the exemplary embodiment of IPv6 and its neighbor discovery protocol, the disclosed systems and methods are not limited to that embodiment and may encompass any suitable selection of an algorithm, endpoints, and/or variables or values for specifying a timing interval. Moreover, modules 102 (such as cache module 104 and timeout module 106) may specify one or more of these variables on a node basis (e.g., governing some or all neighbor cache entries at that node, such as soliciting node 200) and/or on a granular entry-level such that different neighbor cache entries may have different values for one or more of the same variables (e.g., based on received event information), as discussed further below.

Figure 4:
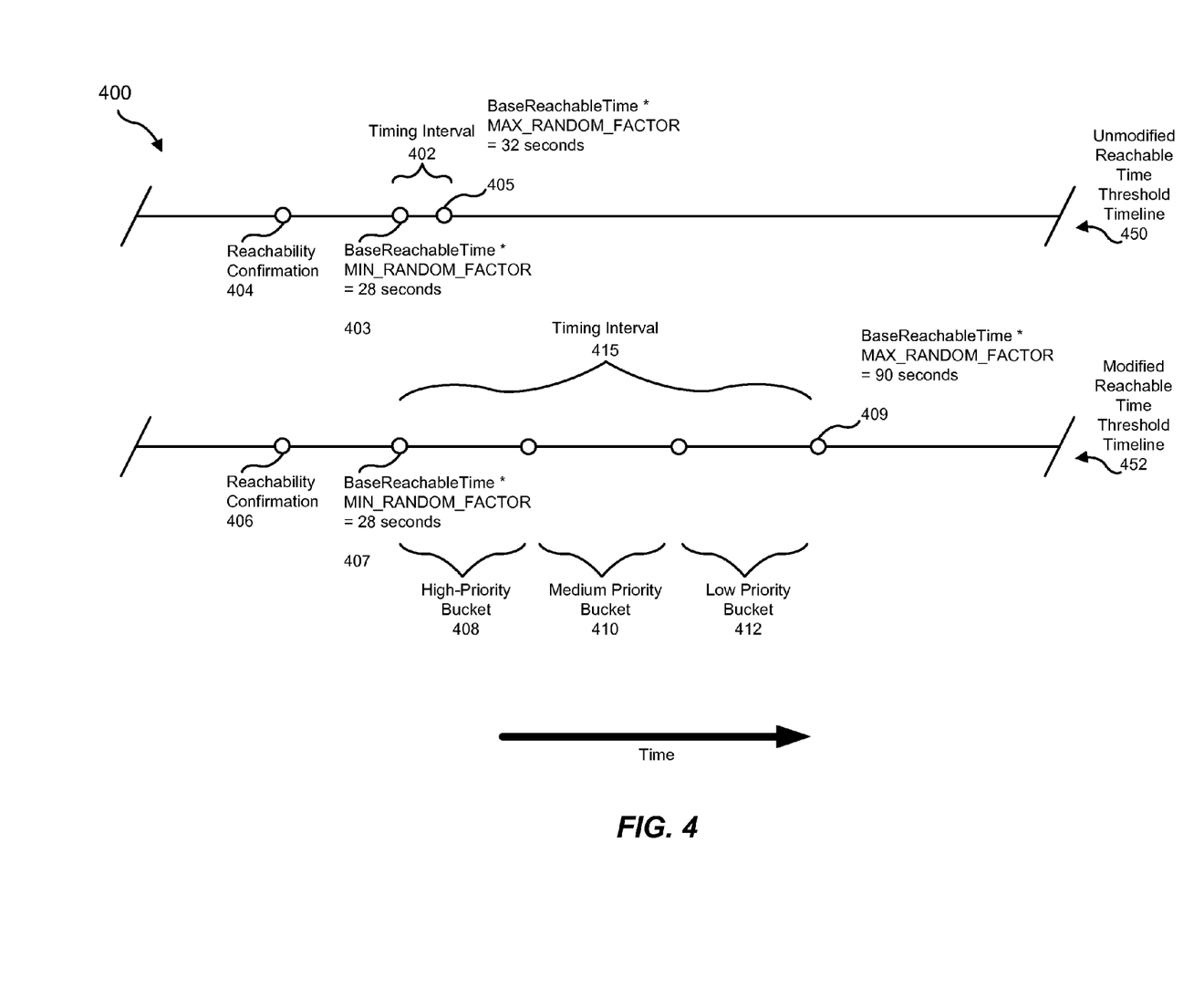
FIG. 4 is a timing diagram that corresponds to an exemplary system for detecting network neighbor reachability.

FIG. 4 shows an exemplary timing diagram 400 that includes both an unmodified reachable time threshold timeline 450 and a modified reachable time threshold timeline 452 (the latter of which corresponds to a modification according to the systems and methods disclosed herein). As shown in FIG. 4, both timeline 450 and timeline 452 may begin with a reachability confirmation 404 and a reachability confirmation 406, respectively. The reachability confirmation may correspond to a neighbor advertisement transmitted in response to a neighbor solicitation as defined within IPv6 and its neighbor discovery protocol, as discussed above. Upon reachability confirmation 404, a period of time may begin to elapse that is defined as the reachable time threshold (e.g., "ReachableTime"), which is selected from values within a timing interval 402. As further shown in FIG. 4, timing interval 402 may begin at a point 403 that occurs 28 seconds after reachability confirmation 404 and end at a point 405 that occurs 32 seconds after reachability confirmation 404.

Notably, in some examples, the reachable time threshold may only be selected from integer or whole values of a time unit (e.g., seconds) within (or at one or both edges) of the timing interval. In the example of FIG. 4, the reachable time threshold may only be selected from the options of 28 seconds, 29 seconds, 30 seconds, 31 seconds, and 32 seconds after reachability confirmation 404. Accordingly, if a sufficiently large number (e.g., larger than five) of neighbor cache entries all confirmed reachability at the same time as reachability confirmation 404, then a large number of collisions may result because, despite the random spread of reachable time thresholds across timing interval 402, the timing interval is simply too small to avoid collisions on integer or whole values (e.g., in seconds).

Returning to FIG. 3, at step 330, one or more of the systems described herein may receive event information about whether the neighbor is active. For example, reception module 108 may, as part of system 100, receive event information 222 about whether neighbor 220 is active.

As used herein, the term "event information" generally refers to information about a specific network event, including the transmission and/or reception of a network packet. In exemplary embodiments, event information may correspond to information about a network packet originating from neighbor 220 and arriving at network bridge 240, a network packet originating from neighbor 220 and arriving at an interface of soliciting node 200 (e.g., a sampled network packet and/or a network discovery packet according to IPv6), and/or information about any other event within the overall network environment that provides an indication of whether neighbor 220 is active.

Moreover, the term "active" as used herein generally refers to a node providing an indication that the node is live and/or properly functioning on the network and thereby still reachable or a candidate for reachability. In contrast, an indication of a non-active node indicates that the node may be down, failed, non-functioning, and/or unreachable, as discussed further below.

Reception module 108 may receive the event information in a variety of ways. For example, the event information about whether the neighbor is active may include a network bridge record of a media access control address that corresponds to both the neighbor and a packet that arrived at a network bridge, such as network bridge 240. The arrival of the packet at network bridge 240 confirms that the neighbor was active at the time of transmitting the packet. Accordingly, reception module 108 may poll network bridge 240 for information about arriving packets (and corresponding media access control addresses), inspect a media access control address table of network bridge 240, and/or otherwise receive event information from network bridge 240 about whether neighbor 220 is active.

Figure 5:
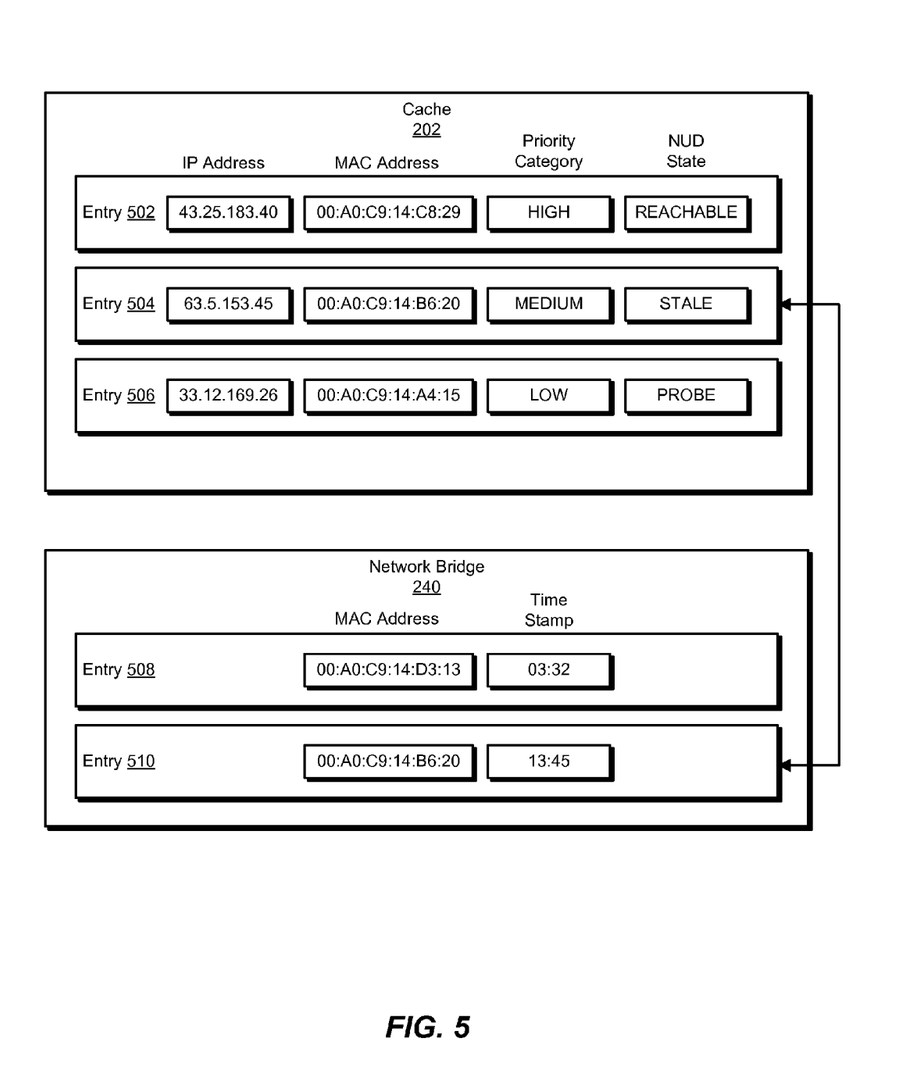
FIG. 5 is an exemplary block diagram of a cache and a network bridge that correspond to an exemplary system for detecting network neighbor reachability.

Reception module 108 may also discard entries at the network bridge that are stale (i.e., older than a threshold) and/or biasing module 110 may discount their relevance in proportion to their age according to one or more biasing formulas. FIG. 5 shows an example 500 of both cache 202 and network bridge 240. As shown in FIG. 5, cache 202 may include an entry 502, an entry 504, and an entry 506. Similarly, network bridge 240 may include an entry 508 and an entry 510. Notably, network bridge 240 may be configured to record MAC addresses for some or all packets that arrive at network bridge 240 as well as a timestamp of their arrival. In the example of FIG. 5, entry 510 corresponds to the same MAC address as entry 504. Accordingly, entry 510 may correspond to the event information received by reception module 108 and used by biasing module 110 to bias the selection of the reachable time threshold, as discussed further below. In this example, entry 510 indicates MAC address activity but cannot confirm an IP and MAC address binding and, therefore, biasing module 110 has categorized entry 504 in a medium priority category. Alternatively, if the timestamp for entry 510 (i.e., 13:45) passed a threshold of age, then reception module 108 and/or biasing module 110 may discard and/or proportionally discount entry 510 as evidence of neighbor activity. Biasing module 110 and confirmation of IP and MAC address binding are also discussed in more detail below.

In another example, reception module 108 may receive the event information about whether the neighbor is active by sampling a network packet at an interface of soliciting node 200 that is attempting to determine whether neighbor 220 is reachable. These network packets may correspond to neighbor discovery packets in IPv6 (e.g., Router Solicitation (Type 133), Router Advertisement (Type 134), Neighbor Solicitation (Type 135), Neighbor Advertisement (Type 136), and/or Redirect (Type 137) messages) or any other suitable messages that provide indications of activity by neighbor 220. Notably, an indication that neighbor 220 is active (e.g., properly functioning) may suggest that neighbor 220 is reachable (i.e., two-way reachable) but does not confirm that neighbor 220 is reachable at least because a problem outside neighbor 220 may prevent reachability.

Returning to FIG. 3, at step 340, one or more of the systems described herein may bias, based on the received event information about whether the neighbor is active, a selection of the reachable time threshold within the timing interval. For example, biasing module 110 may, as part of system 100, bias, based on received event information 222 about whether neighbor 220 is active, a selection of the reachable time threshold within the timing interval.

As used herein, the phrase "bias" generally refers to adjusting, altering, selecting, and/or determining a method, mechanism, formula, and/or categorization for further selecting the reachable time threshold. Moreover, altering the method for selecting the reachable time threshold may include altering an underlying algorithm, variable, probability distribution, and/or timing interval for selecting the reachable time threshold, thereby resulting in a different selection of the reachable time threshold than in the absence of the altering. In general, biasing may refer to focusing a selection of the reachable time threshold within a subset of the timing interval and/or increasing the probability that the reachable time threshold will be selected from one subset of the timing interval rather than another (e.g. thereby statistically pushing the selection in a direction either toward the floor or the ceiling of the timing interval).

In exemplary embodiments, a generic and unmodified system may select the reachable time threshold according to one formula or mechanism. Upon receiving corresponding event information, the disclosed systems and methods may thereby bias, or adjust, the method for selecting the reachable time threshold. For example, instead of selecting a uniformly random value within the original timing interval 402, the disclosed systems and methods may bias the selection of the reachable time threshold based on the received event information to render the selection non-random and more efficient, as discussed further below.

Biasing module 110 may bias the selection of the reachable time threshold in a variety of ways. Optionally, biasing module 110 may expand an original timing interval, such as timing interval 402, to an expanded timing interval, such as a timing interval 415 shown in FIG. 4. Biasing module 110 may expand timing interval 402 in any suitable manner, such as by altering the value of BaseReachableTime, MIN_RANDOM_FACTOR, and/or MAX_RANDOM_FACTOR. As shown in FIG. 4, a timing interval 415 may begin at a point 407 that occurs 28 seconds after the occurrence of reachability confirmation 406 and end at a point 409 that occurs 90 seconds after the occurrence of reachability confirmation 406.

In some examples, biasing module 110 may expand the original timing interval in response to receiving event information 222. Moreover, biasing module 110 may generally bias the selection of the reachable time threshold by (A) altering the size and/or definition of an original timing interval (e.g., altering at least one of a minimum value and a maximum value for the timing interval) and/or (B) altering the manner or method of selecting the reachable time threshold from within the modified or unmodified original timing interval (e.g., focusing on a subset of the modified or unmodified timing interval). Notably, both of these methods can overlap and result in effectively or substantially the same modification.

In additional examples, biasing module 110 may bias the selection of the reachable time threshold at least in part by categorizing the neighbor cache entry into an estimated activity categorization based on the received event information. For example, FIG. 4 shows that timing interval 415 is divided between three priority buckets, high-priority bucket 408, medium priority bucket 410, and low priority bucket 412. Although these buckets do not overlap in the example of FIG. 4, in other examples they may overlap (e.g., may all begin at point 407). In more specific examples, biasing module 110 may categorize the neighbor cache entry into an estimated activity categorization that specifies one of (A) a state in which a media access control address of the neighbor cache entry is known to be active (e.g., corresponding to medium priority bucket 410) and (B) a state that confirms a binding between a media access control address and an internet protocol address of the neighbor cache entry (e.g., corresponding to low priority bucket 412). In other examples, in the absence of received event information or other confirmation (i.e., in other words, event information indicating no events or activity), biasing module 110 may categorize the neighbor cache entry into an estimated activity categorization that specifies a state of no confirmed activity (e.g., corresponding to high-priority bucket 408). In general, after categorizing the neighbor cache entry, biasing module 110 may bias the selection of the reachable time threshold by (A) selecting the reachable time threshold from within the categorized bucket and/or (B) increasing a probability that the reachable time threshold will be selected within the categorized bucket.

At a more general level, biasing module 110 may process the received event information to calculate a category, or degree, of priority for performing neighbor unreachability detection based on a category, or degree, indicating an extent to which the neighbor is estimated to be active and/or reachable. Fundamentally, greater degrees or indications of activity suggest that the neighbor is more likely to be reachable and, therefore, that neighbor unreachability detection is correspondingly less of a priority. Moreover, biasing module 110 may base the selection of the reachable time threshold on a discrete level (e.g., by categorizing the neighbor into one of three discrete priority buckets) and/or on a granular level (e.g., by applying a random drift and/or biasing the selection in granular proportion to a calculated degree of activity). Notably, biasing module may select the reachable time threshold by performing calculations on the discrete level and the granular level in a serial order (including vice versa). In some examples, biasing module 110 may also select the reachable time threshold from among discrete or granular units of time (e.g., 4.2 seconds or milliseconds).

In one example, the received event information may include the sample of the network packet at soliciting node 200, as discussed above. In this example, biasing module 110 may distinguish between forwarded packets, which include the source IP address of the node that originated the packet and the MAC address of the intermediary node that forwards the packet, and originating packets, which include the source IP address and MAC address of the node that originated the packet. In the latter case, biasing module 110 may determine whether a media access control address and an internet protocol address of the sampled network packet match the media access control address and the internet protocol address of the neighbor cache entry (e.g., the IP and MAC binding previously recorded within cache 202 by soliciting node 200 upon first discovering neighbor 220). By comparing these values, biasing module 110 may confirm whether the IP and MAC binding is still valid. A confirmation of the IP and MAC binding indicates a comparatively higher degree of activity and, therefore, a proportionally lower degree of priority. Accordingly, in the case of a match and confirmation, biasing module 110 may bias the selection of the reachable time threshold at least in part by categorizing the neighbor cache entry into an estimated activity categorization that specifies a state that confirms a binding between the media access control address and the internet protocol address of the neighbor cache entry (e.g., low priority bucket 412).

Alternatively, if the IP and MAC binding is no longer valid for one of various reasons (e.g., relocation and/or expiration of the IP address and/or binding), then biasing module 110 may simply categorize the neighbor cache entry into an estimated activity categorization that specifies a state of confirming the media access control address alone without further confirming the IP and MAC binding (e.g., medium priority bucket 410). Similarly, if the sampled network packet is a forwarded packet rather than an originating packet, then biasing module 110 may categorize the packet in medium priority bucket 410, because the forwarded packet does not contain the MAC address of the originating node that corresponds to the IP address and, therefore, cannot provide information to confirm or disconfirm the binding. Alternatively, if the IP and MAC binding is no longer valid because of deletion of the IP address and/or binding, then biasing module 110 may simply categorize the neighbor cache entry into high priority bucket 408, because both reachability and livability are lost. In general, evidence of the IP and MAC address being valid indicates a comparatively higher degree of activity (and lower degree of priority) than mere confirmation of MAC address activity, which in turn indicates a comparatively higher degree of activity (and even lower degree of priority) than no evidence or confirmation at all (highest degree of priority). Moreover, after categorizing the neighbor cache entry within one or more priority buckets, biasing module 110 may then select the reachable time threshold within the corresponding bucket in any suitable uniform random and/or non-random manner.

As illustrated in FIG. 3, at step 350, one or more of the systems described herein may determine whether the neighbor is reachable based at least in part on a determination of whether the selected reachable time threshold has been satisfied. For example, determination module 112 may, as part of system 100, determine whether neighbor 220 is reachable based at least in part on a determination of whether the selected reachable time threshold has been satisfied. As used herein, the phrase "selected reachable time threshold has been satisfied" generally refers to a determination of whether an amount of time defined by the selected reachable time threshold has elapsed (e.g., according to a "greater than" or "greater than or equal to" comparison) since a neighbor reachability confirmation, as discussed further below.

Determination module 112 may determine whether the neighbor is reachable in a variety of ways. In general, determination module 112 may determine whether the neighbor is reachable by applying a modified and/or unmodified formula or algorithm according to a neighbor unreachability detection algorithm, such as neighbor unreachability detection in IPv6. In this example, the disclosed systems and methods may bias the selection of the reachable time threshold without necessarily biasing or altering the other aspects of node unreachability detection. After biasing the selection of the reachable time threshold, determination module 112 in general may simply determine whether the threshold has been satisfied and/or exceeded.

Figure 6:
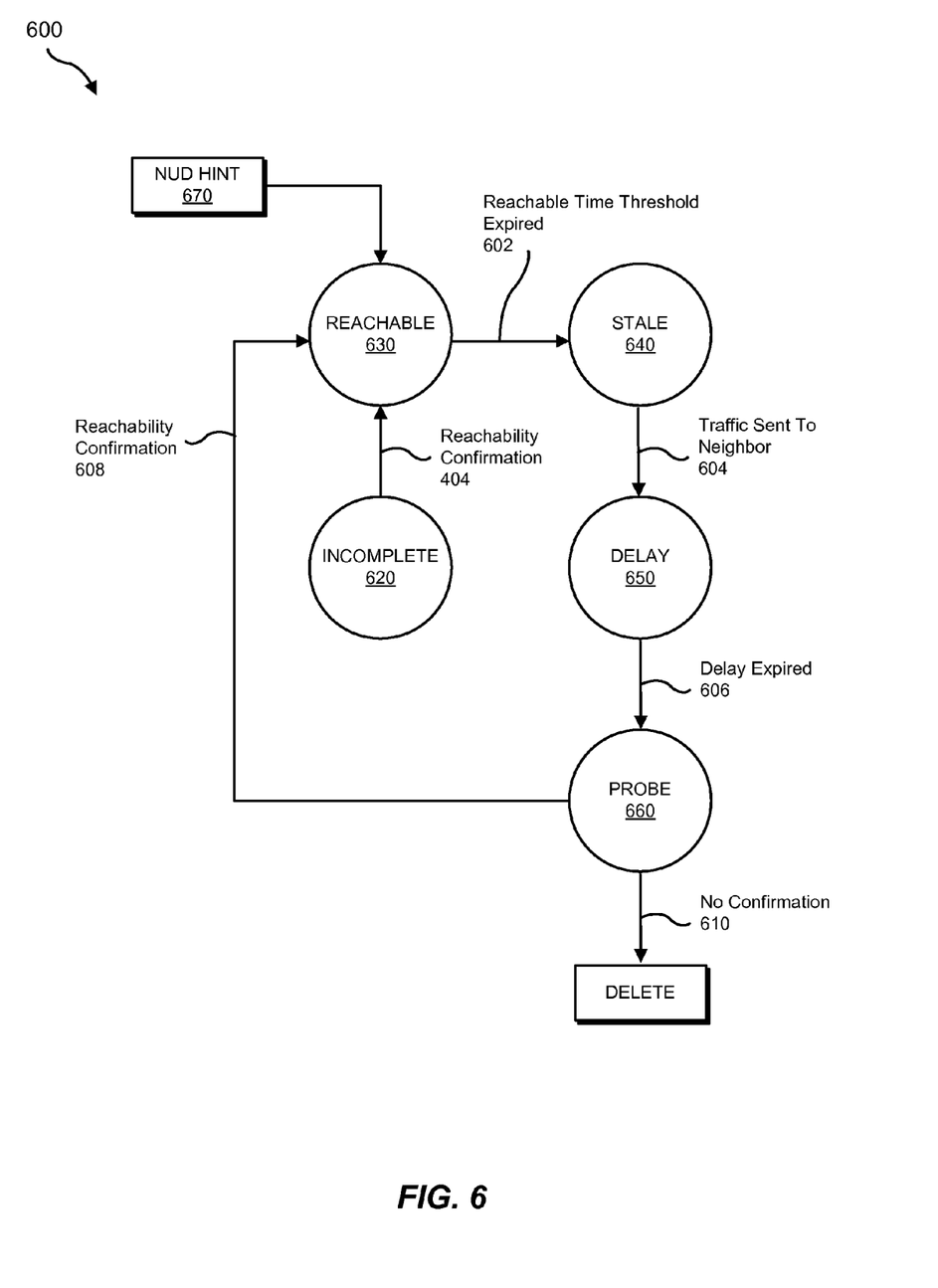
FIG. 6 is an exemplary state diagram that corresponds to an exemplary system for detecting network neighbor reachability.

FIG. 6 shows an exemplary state diagram 600 according to a network unreachability detection protocol (e.g., in IPv6 neighbor discovery). Initially, a neighbor cache entry may be incomplete at an incomplete state 620. Through neighbor discovery, one or more of modules 102, such as reception module 108, may receive a neighbor advertisement at reachability confirmation 404 (as discussed above), thereby transitioning to a reachable state 630. The systems and methods herein generally relate to techniques for determining how long to remain within reachable state 630. Specifically, the systems and methods herein generally bias a selection of a reachable time threshold within a timing interval, as further discussed above. At an expiration of the reachable time threshold 602, the state may transition to a stale state 640. The neighbor cache entry may remain in stale state 640 until traffic is sent to the neighbor at step 604, thereby transitioning to a delay state 650, which may simply execute an arbitrary delay. The neighbor cache entry may also transition to delay state 650 due to the expiration of a stale state timer.

At the expiration of the delay 606, the state may transition to a probe state 660, which may begin the process of probing (e.g. through neighbor solicitation messages) the neighbor for confirmation of reachability. Notably, at any point in state diagram 600, a network unreachability detection hint from a network discovery protocol or network unreachability detection packet (or any other protocol packet, such as a packet from a protocol that is conceptually higher according to a network model than the network unreachability detection protocol) may confirm that a neighbor is reachable and thereby transition the state diagram to reachable state 630. This is shown by NUD hint 670 in FIG. 6 (connecting arrows from the various states in state diagram 600 to NUD hint 670 are omitted for clarity). Moreover, biasing module 110 may bias any timing variable or threshold for sending original and retry neighbor solicitation messages in a manner that parallels any of the manners described above for selecting the reachable time threshold. If there is no confirmation at a step 610, then cache module 104 may simply delete the neighbor cache entry. Alternatively, at a reachability confirmation 608, the state may transition again to reachable state 630. Further details of the example state diagram and associated state transition rules are provided in the specification for IPv6 neighbor discovery, which is incorporated herein by reference in its entirety.

As explained above, embodiments of the instant disclosure may enable computer networking systems to perform neighbor unreachability detection more efficiently while avoiding large numbers of simultaneous transmissions of neighbor solicitation messages. Specifically, embodiments of the instant disclosure may enable computer networking systems to expand a timing interval in which to select a reachable time threshold without allowing higher priority neighbor solicitation messages to wait unduly long.

Figure 7:
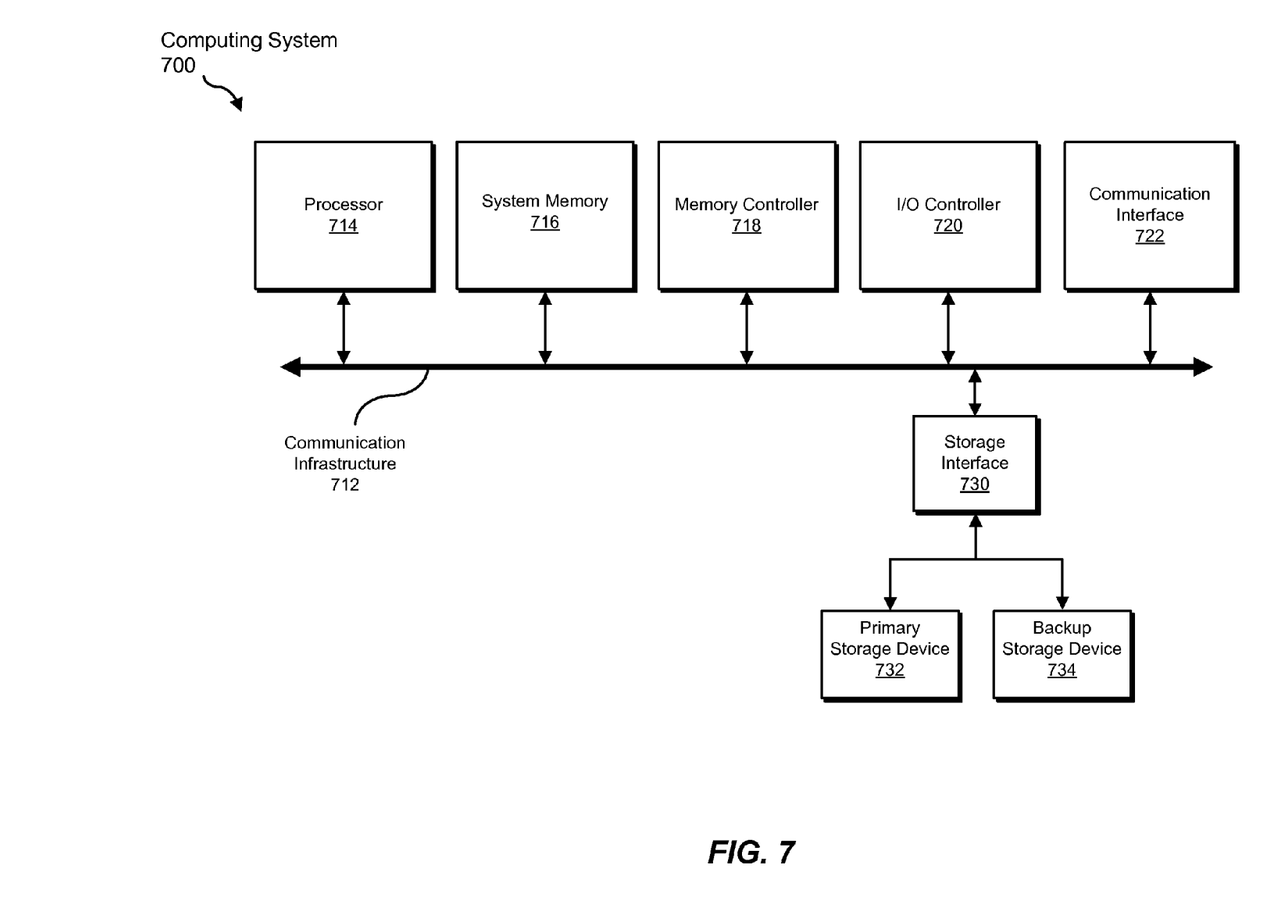
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 3. All or a portion of computing system 700 may also perform and/or be a means for performing and/or implementing any other steps, methods, or processes described and/or illustrated herein. In one example, computing system 700 may include or correspond to system 100 from FIG. 1.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. For example, processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a wide area network, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

In addition, one or more of the modules described herein may transform data, physical devices, and/or representations of physical devices from one form to another. For example, one or more of the modules recited herein may receive network data and/or network management data to be transformed, transform the data by adjusting, forwarding, and/or categorizing the data, output a result of the transformation to a display, storage, and/or other network node, use the result of the transformation to more efficiently perform node unreachability detection, and store the result of the transformation to a cache or other memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
   a cache module, stored in memory, that stores a neighbor cache entry that specifies whether a neighbor of a network node is reachable according to a detection mechanism of a neighbor unreachability detection protocol;
   a timeout module, stored in memory, that specifies a timing interval in which to select a reachable time threshold that defines a length of time during which the neighbor is designated as reachable according to the neighbor unreachability detection protocol;
   a reception module, stored in memory, that receives event information about whether the neighbor is active;
   a biasing module, stored in memory, that biases, based on the received event information about whether the neighbor is active, a selection of the reachable time threshold within the timing interval by performing at least one of:
      altering a size of the timing interval; and
      focusing the selection of the reachable time threshold on a subset of the timing interval;
   a determination module, stored in memory, that determines whether the neighbor is reachable based at least in part on a determination of whether the selected reachable time threshold has been satisfied; and
   at least one physical processor configured to execute the cache module, the timeout module, the reception module, the biasing module, and the determination module, wherein:
   the biasing module biases the selection of the reachable time threshold within the timing interval such that neighbor unreachability detection is performed more efficiently and network congestion is reduced.

2. The system of claim 1, wherein the biasing module biases the selection of the reachable time threshold at least in part by categorizing the neighbor cache entry into an estimated activity categorization based on the received event information.

3. The system of claim 2, wherein the estimated activity categorization of the neighbor cache entry specifies one of:
   a state of no confirmed activity;
   a state in which a media access control address of the neighbor cache entry is known to be active; and
   a state that confirms a binding between a media access control address and an internet protocol address of the neighbor cache entry.

4. The system of claim 1, wherein the event information about whether the neighbor is active comprises at least one of:
   a network bridge record of a media access control address that corresponds to both the neighbor and a packet that arrived at a corresponding network bridge; and
   a sampling of a network packet sampled at an interface of the network node attempting to determine whether the neighbor is reachable.

5. The system of claim 4, wherein:
   the event information comprises the network bridge record; and
   the biasing module biases the selection of the reachable time threshold at least in part by categorizing the neighbor cache entry into an estimated activity categorization that specifies a state in which a media access control address of the neighbor cache entry is known to be active.

6. The system of claim 4, wherein:
   the event information comprises the sampling of the network packet;
   the biasing module determines that the network packet comprises an originated packet rather than a forwarded packet; and
   the biasing module determines whether a media access control address and an internet protocol address of the network packet match a media access control address and an internet protocol address of the neighbor cache entry.

7. The system of claim 6, wherein:
   the biasing module determines that the media access control address and the internet protocol address of the network packet match the media access control address and the internet protocol address of the neighbor cache entry; and
   the biasing module biases the selection of the reachable time threshold at least in part by categorizing the neighbor cache entry into an estimated activity categorization that specifies a state that confirms a binding between the media access control address and the internet protocol address of the neighbor cache entry.

8. The system of claim 1, wherein the neighbor unreachability detection protocol corresponds to neighbor unreachability detection of internet protocol version six.

9. The system of claim 8, wherein the event information comprises a neighbor discovery packet.

10. The system of claim 1, wherein the biasing module biases the selection of the reachable time threshold at least in part by altering at least one of a minimum value and a maximum value for the timing interval in which to select the reachable time threshold.

11. A method comprising:
   storing a neighbor cache entry that specifies whether a neighbor of a network node is reachable according to a detection mechanism of a neighbor unreachability detection protocol;
   specifying a timing interval in which to select a reachable time threshold that defines a length of time during which the neighbor is designated as reachable according to the neighbor unreachability detection protocol;
   receiving event information about whether the neighbor is active;
   biasing, based on the received event information about whether the neighbor is active, a selection of the reachable time threshold within the timing interval by performing at least one of:
      altering a size of the timing interval; and
      focusing the selection of the reachable time threshold on a subset of the timing interval; and
   determining whether the neighbor is reachable based at least in part on a determination of whether the selected reachable time threshold has been satisfied, wherein:
   biasing the selection of the reachable time threshold within the timing interval improves an efficiency of performing neighbor unreachability detection and reduces network congestion.

12. The method of claim 11, wherein biasing the selection of the reachable time threshold comprises categorizing the neighbor cache entry into an estimated activity categorization based on the received event information.

13. The method of claim 12, wherein the estimated activity categorization of the neighbor cache entry specifies one of:
   a state of no confirmed activity;
   a state in which a media access control address of the neighbor cache entry is known to be active; and
   a state that confirms a binding between a media access control address and an internet protocol address of the neighbor cache entry.

14. The method of claim 11, wherein the event information about whether the neighbor is active comprises at least one of:
   a network bridge record of a media access control address that corresponds to both the neighbor and a packet that arrived at a corresponding network bridge; and
   a sampling of a network packet sampled at an interface of the network node attempting to determine whether the neighbor is reachable.

15. The method of claim 14, wherein:
   the event information comprises the network bridge record; and
   biasing the selection of the reachable time threshold comprises categorizing the neighbor cache entry into an estimated activity categorization that specifies a state in which a media access control address of the neighbor cache entry is known to be active.

16. The method of claim 14, wherein:
   the event information comprises the sampling of the network packet;
   the method further comprises determining that the network packet comprises an originated packet rather than a forwarded packet; and
   biasing the selection of the reachable time threshold comprises determining whether a media access control address and an internet protocol address of the network packet match a media access control address and an internet protocol address of the neighbor cache entry.

17. The method of claim 16, wherein:
   biasing the selection of the reachable time threshold comprises determining that the media access control address and the internet protocol address of the network packet match the media access control address and the internet protocol address of the neighbor cache entry; and
   biasing the selection of the reachable time threshold comprises categorizing the neighbor cache entry into an estimated activity categorization that specifies a state that confirms a binding between the media access control address and the internet protocol address of the neighbor cache entry.

18. The method of claim 11, wherein the neighbor unreachability detection protocol corresponds to neighbor unreachability detection of internet protocol version six.

19. The method of claim 18, wherein the event information comprises a neighbor discovery packet.

20. A non-transitory computer-readable medium comprising one or more computer-readable instructions that, when executed by at least one processor of a computing device, cause the computing device to:
   store a neighbor cache entry that specifies whether a neighbor of a network node is reachable according to a detection mechanism of a neighbor unreachability detection protocol;
   specify a timing interval in which to select a reachable time threshold that defines a length of time during which the neighbor is designated as reachable according to the neighbor unreachability detection protocol;
   receive event information about whether the neighbor is active;
   bias, based on the received event information about whether the neighbor is active, a selection of the reachable time threshold within the timing interval by performing at least one of:
      altering a size of the timing interval; and
      focusing the selection of the reachable time threshold on a subset of the timing interval; and
   determine whether the neighbor is reachable based at least in part on a determination of whether the selected reachable time threshold has been satisfied, wherein:
   biasing the selection of the reachable time threshold within the timing interval improves an efficiency of performing neighbor unreachability detection and reduces network congestion.

* * * * *